(12) United States Patent
Washino et al.

(10) Patent No.: US 11,697,276 B2
(45) Date of Patent: Jul. 11, 2023

(54) COMPOSITION, COATING FILM, FLUORINE-CONTAINING COATING FILM AND LAMINATE

(71) Applicant: DAIKIN INDUSTRIES, LTD., Osaka (JP)

(72) Inventors: Keiko Washino, Osaka (JP); Katsuhiko Imoto, Osaka (JP); Koichiro Ogita, Osaka (JP); Susumu Wada, Osaka (JP); Yasukazu Nakatani, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/882,114

(22) Filed: May 22, 2020

(65) Prior Publication Data
US 2020/0282713 A1 Sep. 10, 2020

Related U.S. Application Data

(62) Division of application No. 15/749,802, filed as application No. PCT/JP2016/073196 on Aug. 5, 2016, now abandoned.

(30) Foreign Application Priority Data

Aug. 7, 2015 (JP) .................. 2015-157663

(51) Int. Cl.
| | | |
|---|---|---|
| *B32B 27/32* | (2006.01) | |
| *B32B 15/082* | (2006.01) | |
| *C09D 201/04* | (2006.01) | |
| *C09D 7/40* | (2018.01) | |
| *B32B 15/095* | (2006.01) | |
| *C08G 18/79* | (2006.01) | |
| *C08G 18/62* | (2006.01) | |
| *C09D 127/18* | (2006.01) | |
| *C08G 18/38* | (2006.01) | |
| *C09D 5/08* | (2006.01) | |
| *C09D 175/04* | (2006.01) | |
| *C09D 127/12* | (2006.01) | |
| *C08K 5/11* | (2006.01) | |
| *B32B 27/38* | (2006.01) | |
| *C09D 7/65* | (2018.01) | |
| *B32B 27/30* | (2006.01) | |

(52) U.S. Cl.
CPC .......... *B32B 27/322* (2013.01); *B32B 15/082* (2013.01); *B32B 15/095* (2013.01); *B32B 27/38* (2013.01); *C08G 18/3821* (2013.01); *C08G 18/6279* (2013.01); *C08G 18/792* (2013.01); *C08K 5/11* (2013.01); *C09D 5/08* (2013.01); *C09D 7/40* (2018.01); *C09D 127/12* (2013.01); *C09D 127/18* (2013.01); *C09D 175/04* (2013.01); *C09D 201/04* (2013.01); *B32B 27/304* (2013.01); *C09D 7/65* (2018.01)

(58) Field of Classification Search
CPC .. C09D 127/12; C09D 127/18; C09D 175/04; C09D 201/04; C09D 5/08; C09D 7/40; C09D 7/65; C08K 5/0008; C08K 5/175; C08K 5/11; B32B 15/082; B32B 15/095; B32B 27/304; B32B 27/322; B32B 27/38; C08G 18/3821; C08G 18/6279; C08G 18/792
See application file for complete search history.

(56) References Cited

U.S. PATENT DOCUMENTS

| | | | |
|---|---|---|---|
| 4,412,054 | A | 10/1983 | Yamabe et al. |
| 5,623,045 | A | 4/1997 | Zwiener et al. |
| 6,169,141 | B1 | 1/2001 | Kurek et al. |
| 2006/0054053 | A1 | 3/2006 | Masutani et al. |
| 2009/0220795 | A1 | 9/2009 | Connelly et al. |

FOREIGN PATENT DOCUMENTS

| | | |
|---|---|---|
| JP | 58-041563 A | 3/1983 |
| JP | 59-028968 A | 2/1984 |
| JP | 2-206611 A | 8/1990 |
| JP | 7-305025 A | 11/1995 |
| JP | 2000-026799 A | 1/2000 |
| JP | 2011-037928 A | 2/2011 |
| JP | 2011-231353 A | 11/2011 |
| WO | 2004/067658 A1 | 8/2004 |
| WO | 2012/041534 A1 | 4/2012 |

OTHER PUBLICATIONS

Guojie Liu, "Modern Coating and Painting Technology", China Light Industry Press, May 2002, pp. 87-88 (5 pages).
Communication dated Jan. 31, 2019 from the European Patent Office in EP Application No. 16835114.6.
International Preliminary Report on Patentability with translation of Written Opinion dated Feb. 13, 2018 in counterpart international application No. PCT/JP2016/073196.
International Search Report for PCT/JP2016/073196 dated Sep. 6, 2016 [PCT/ISA/210].

*Primary Examiner* — Frances Tischler
(74) *Attorney, Agent, or Firm* — Sughrue Mion, PLLC

(57) ABSTRACT

A coating film obtained from a composition containing a polyaspartic acid ester and a fluoropolymer. Also disclosed is fluorine-containing coating film including a urethane bond and a urea bond, and exhibiting a corrosion from scribe of 1 mm or shorter. Both coating films have a thickness of 100 to 1000 μm. Also disclosed is a laminate including a base and one or the other of the coating films.

14 Claims, No Drawings

COMPOSITION, COATING FILM, FLUORINE-CONTAINING COATING FILM AND LAMINATE

CROSS-REFERENCE TO RELATED APPLICATIONS

This application is a divisional of U.S. application Ser. No. 15/749,802, filed Feb. 2, 2018, which is a National Stage of International Application No. PCT/JP2016/073196, filed Aug. 5, 2016, which claims priority from Japanese Patent Application No. 2015-157663, filed Aug. 7, 2015, the disclosures of which are incorporated herein by reference in their respective entireties.

TECHNICAL FIELD

The invention relates to compositions, coating films, fluorine-containing coating films, and laminates.

BACKGROUND ART

Coatings containing polyaspartic acid esters are known for their ability to form coating films having high hardness and excellent solvent resistance.

For example, Patent Literature 1 discloses a coating containing: a) a polyisocyanate component; b1) a polyaspartic acid ester; and b2) a polyaldimine or polyketimine.

Patent Literature 2 discloses a coating composition capable of forming a thick coating film that has excellent adhesiveness, is not cracked even by heating, and has excellent weather resistance. This coating composition contains: A) a polyisocyanate component; B) a polyaspartic acid ester; C) a polyaldimine or polyketimine; D) an acetal; E) castor oil; F) an organic solvent; and G) a pigment.

CITATION LIST

Patent Literature

Patent Literature 1: JP H07-305025 A
Patent Literature 2: JP 2000-26799 A

SUMMARY OF INVENTION

Technical Problem

Offshore structures or port facilities require not only reduction of damages due to sunlight or rainwater but also reduction of damages due to salt. Some offshore structures or port facilities are installed far away from the land, and are not easy to repair in such cases. Thus, coating films formed to protect them cannot be easily repainted. On the contrary, coatings currently used therefor need repainting every three to five years. This unfortunately causes an increase in the maintenance cost and, in the cases of offshore structures contributing to petroleum production, a reduction in the productivity due to suspension of the production for maintenance. Thus, coating films applied thereto need to enable a shorter working time and to have high salt water resistance and weather resistance. In order to achieve these requirements, improvement is required in conventional coatings containing polyaspartic acid esters.

In view of the above state of the art, the invention aims to provide a composition capable of forming a coating film that is excellent in salt water resistance and weather resistance and is less likely to deteriorate for a long time.

Solution to Problem

The invention relates to a composition containing a polyaspartic acid ester and a fluoropolymer.

The polyaspartic acid ester is preferably represented by the following formula (1):

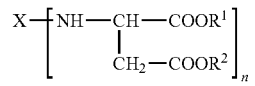

wherein X is an n-valent group obtainable from an organic polyamine that contains n primary amino groups bonding to an acyclic or cyclic aliphatic structure and that has a number average molecular weight of 88 to 400 by removing the primary amino groups therefrom; $R^1$ and $R^2$ are the same as or different from each other, and are each a C1-C18 organic group; and n is an integer of 2 or greater.

The fluoropolymer is preferably a curable functional group-containing fluoropolymer.

The fluoropolymer is preferably a hydroxy-containing fluoropolymer.

In the composition, the polyaspartic acid ester and the fluoropolymer preferably have a mass ratio of 5/95 to 95/5.

The composition preferably further contains a curing agent, and the curing agent is preferably a polyisocyanate compound.

The composition preferably further contains a solvent.

The composition preferably serves as a coating.

The composition preferably serves as a coating to be applied to an offshore structure or a port facility.

The invention also relates to a coating film obtainable from the above composition.

The coating film preferably has a thickness of 100 to 1000 µm.

The invention also relates to a fluorine-containing coating film containing a urethane bond and a urea bond and exhibiting a corrosion from scribe of 1 mm or shorter.

The fluorine-containing coating film preferably has a thickness of 100 to 1000 µm.

The invention also relates to a laminate including a base and the above coating film or fluorine-containing coating film.

The laminate preferably further includes a layer formed of epoxy resin.

The base is preferably formed of iron.

Advantageous Effects of Invention

Since the composition of the invention has the above configuration, it is capable of forming a coating film that is excellent in salt water resistance and weather resistance and that is less likely to deteriorate for a long time. Also, the composition can form a thick coating film by a single coating process. Thus, the working is completed in a short time even when a thick coating film is required.

Since the coating film of the invention has the above configuration, it is excellent in salt water resistance and weather resistance and is less likely to deteriorate for a long time.

Since the fluorine-containing coating film of the invention has the above configuration, it is excellent in salt water resistance and weather resistance and is less likely to deteriorate for a long time.

Since the laminate of the invention has the above configuration, it is excellent in salt water resistance and weather resistance and is less likely to deteriorate for a long time.

DESCRIPTION OF EMBODIMENTS

The invention will be specifically described hereinbelow.

The composition of the invention contains a polyaspartic acid ester and a fluoropolymer.

The polyaspartic acid ester is preferably a polyaspartic acid ester represented by the following formula (1):

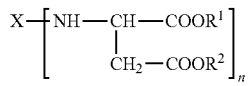

wherein X is an n-valent group obtainable from an organic polyamine that contains n primary amino groups bonding to an acyclic or cyclic aliphatic structure and that has a number average molecular weight of 88 to 400 by removing the primary amino groups therefrom; $R^1$ and $R^2$ are the same as or different from each other, and are each a C1-C18 organic group; and n is an integer of 2 or greater.

Preferably, n is 2.

X is preferably a C6-C30 divalent hydrocarbon group, preferably a group obtainable by removing the amino groups from 1-amino-3,3,5-trimethyl-5-aminomethylcyclohexane, 4,4'-diaminodicyclohexylmethane, 3,3'-dimethyl-4,4'-diaminodicyclohexylmethane, hexahydro-2,4-diaminotoluene, hexahydro-2,6-diaminotoluene, isomeric C-monomethyl diaminodicyclohexylmethane, or 3(4)-aminomethyl-1-methylcyclohexylamine, more preferably a divalent hydrocarbon group obtainable by removing the amino groups from 3,3'-dimethyl-4,4'-diaminodicyclohexylmethane.

$R^1$ and $R^2$ are each preferably a methyl group, an ethyl group, an n-butyl group, or a 2-ethylhexyl group, more preferably an ethyl group.

For example, the polyaspartic acid ester can be produced by a known method in which a primary polyamine represented by the formula: X—(—$NH_2$)$_n$ (wherein n and X are defined as mentioned above) is reacted with a maleic acid ester or fumaric acid ester represented by the formula: $R^1$OOC—CH=CH—COOR$^2$ (wherein $R^1$ and $R^2$ are defined as mentioned above).

The polyaspartic acid ester, the production method thereof, and the polyamine and the maleic acid ester or fumaric acid ester used in the production may be those disclosed in JP H07-305025 A and JP H10-87583 A.

The fluoropolymer may be either a resin polymer having a clear melting point or an elastomeric polymer exhibiting rubber elasticity, or may be a thermoplastic elastomeric polymer between them.

The fluoropolymer is preferably a curable functional group-containing fluoropolymer. Examples of the curable functional group include a hydroxy group, a carboxy group, a group represented by —COOCO—, an amino group, a glycidyl group, a silyl group, a silanate group, and an isocyanate group. The curable functional group is selected as appropriate in accordance with the easiness of producing the polymer and the curing system. From the viewpoint of good curing reactivity, preferred is a hydroxy group, a carboxy group, a group represented by —COOCO—, an amino group, or a silyl group. From the viewpoints of easy availability of the polymer and good reactivity, particularly preferred is a hydroxy group. These curable functional groups are usually introduced into fluoropolymers by copolymerizing monomers containing the curable functional groups.

The fluoropolymer is preferably a hydroxy-containing fluoropolymer. The hydroxy group can be introduced into the fluoropolymer by copolymerizing a hydroxy-containing monomer.

The fluoropolymer preferably has a hydroxyl value of 1 to 600 mgKOH/g. In order to improve the water resistance and adhesion of a coating film to be obtained, the hydroxyl value is more preferably 30 mgKOH/g or more, still more preferably 40 mgKOH/g or more. In order to achieve good solvent solubility and good adhesion of a coating film to be obtained, the hydroxyl value is more preferably 400 mgKOH/g or less, still more preferably 200 mgKOH/g or less. The hydroxyl value is a value determined by the method in conformity with JIS K0070.

The fluoropolymer preferably contains a polymerized unit derived from a fluorine-containing monomer and a polymerized unit derived from a hydroxy-containing monomer.

Examples of the fluorine-containing monomer include tetrafluoroethylene, chlorotrifluoroethylene, vinylidene fluoride, vinyl fluoride, and fluorovinyl ether. One of them or two or more of them may be used.

Preferred among these is at least one selected from the group consisting of tetrafluoroethylene, chlorotrifluoroethylene, and vinylidene fluoride, and more preferred is at least one selected from the group consisting of tetrafluoroethylene and chlorotrifluoroethylene.

The polymerized unit derived from a fluorine-containing monomer preferably represents 15 to 50 mol % of all the polymerized units of the fluoropolymer. The lower limit of this value is more preferably 20 mol %, still more preferably 30 mol %, particularly preferably 40 mol %. The upper limit thereof is more preferably 49 mol %, still more preferably 47 mol %.

Examples of the hydroxy-containing monomer include hydroxy-containing vinyl ethers such as 2-hydroxyethyl vinyl ether, 3-hydroxypropyl vinyl ether, 2-hydroxypropyl vinyl ether, 2-hydroxy-2-methylpropyl vinyl ether, 4-hydroxybutyl vinyl ether, 4-hydroxy-2-methylbutyl vinyl ether, 5-hydroxypentyl vinyl ether, and 6-hydroxyhexyl vinyl ether; and hydroxy-containing allyl ethers such as 2-hydroxyethyl allyl ether, 4-hydroxybutyl allyl ether, and glycerol monoallyl ether. From the viewpoints of excellent polymerization reactivity and curability of functional groups, preferred are hydroxy-containing vinyl ethers, more preferred are hydroxy-containing monomers represented by the formula (2): $CH_2$=CH—($CH_2$)$_l$—O—($CH_2$)$_m$—OH (wherein l is 0 or 1; and m is an integer of 2 or greater), and still more preferred is at least one monomer selected from the group consisting of 4-hydroxybutyl vinyl ether, 2-hydroxyethyl vinyl ether, 2-hydroxyethyl allyl ether, and 4-hydroxybutyl allyl ether.

Examples of other hydroxy-containing monomers include hydroxyalkyl (meth)acrylates such as 2-hydroxyethyl acrylate and 2-hydroxyethyl methacrylate.

The polymerized unit derived from a hydroxy-containing monomer preferably represents 8 to 30 mol % of all the polymerized units constituting the fluoropolymer. The lower limit of this value is more preferably 10 mol % while the upper limit thereof is more preferably 20 mol %.

The fluoropolymer also preferably further contains a polymerized unit of at least one selected from the group consisting of carboxy-containing monomers, amino-containing monomers, and silyl-containing monomers. These polymerized units preferably represent 8 to 30 mol % of all the polymerized units constituting the fluoropolymer. The lower limit of this value is more preferably 10 mol %, while the upper limit thereof is more preferably 20 mol %.

For example, the carboxy-containing monomers are each preferably at least one monomer selected from the group consisting of carboxy-containing monomers represented by the following formula (3):

$$R^3R^4C=CR^5-(CH_2)_n-COOH$$

(wherein $R^3$, $R^4$, and $R^5$ are the same as or different from each other, and are each a hydrogen atom, an alkyl group, a carboxy group, an acyloxy group, or an alkoxycarbonyl group; and n is an integer of 0 or greater), and esters and acid anhydrides thereof, and carboxy-containing vinyl ether monomers represented by the following formula (4):

$$CH_2=CH(CH_2)_nO(R^6OCO)_mR^7COOH$$

(wherein $R^6$ and $R^7$ are the same as or different from each other, and are each a saturated or unsaturated linear, branched, or cyclic alkylene group; n is 0 or 1; and m is 0 or 1).

Specific examples of the carboxy-containing monomers include acrylic acid, methacrylic acid, vinylacetic acid, crotonic acid, pentenoic acid, hexenoic acid, heptenoic acid, octenoic acid, nonenoic acid, decenoic acid, undecylenic acid, dodecenoic acid, tridecenoic acid, tetradecenoic acid, pentadecenoic acid, hexadecenoic acid, heptadecenoic acid, octadecenoic acid, nonadecenoic acid, eicosenoic acid, 22-tricosenoic acid, cinnamic acid, itaconic acid, itaconic acid monoesters, maleic acid, maleic acid monoesters, maleic anhydride, fumaric acid, fumaric acid monoesters, vinyl phthalate, vinyl pyromellitate, 3-allyloxypropionic acid, 3-(2-allyloxyethoxycarbonyl)propionic acid, 3-(2-allyloxybutoxycarbonyl)propionic acid, 3-(2-vinyloxyethoxycarbonyl)propionic acid, and 3-(2-vinyloxybutoxycarbonyl) propionic acid. From the viewpoints of lower homopolymerizability and less formation of the corresponding homopolymer, preferred is at least one acid selected from the group consisting of crotonic acid, undecylenic acid, itaconic acid, maleic acid, maleic acid monoesters, fumaric acid, fumaric acid monoesters, 3-allyloxypropionic acid, and 3-(2-allyloxyethoxycarbonyl)propionic acid.

Examples of the amino-containing monomers include amino vinyl ethers represented by $CH_2=CH-O-(CH_2)_x-NH_2$ (wherein x=0 to 10); allyl amines represented by $CH_2=CH-O-CO(CH_2)_x-NH_2$ (wherein x=1 to 10); and aminomethylstyrene, vinylamine, acrylamide, vinylacetamide, and vinylformamide.

Examples of the silyl-containing monomers include silicone vinyl monomers. Examples of the silicone vinyl monomers include (meth)acrylic acid esters such as $CH_2=CHCO_2(CH_2)_3Si(OCH_3)_3$, $CH_2=CHCO_2(CH_2)_3Si(OC_2H_5)_3$, $CH_2=C(CH_3)CO_2(CH_2)_3Si(OCH_3)_3$, $CH_2=C(CH_3)CO_2(CH_2)_3Si(OC_2H_5)_3$, $CH_2=CHCO_2(CH_2)_3SiCH_3(OC_2H_5)_2$, $CH_2=C(CH_3)CO_2(CH_2)_3SiC_2H_5(OCH_3)_2$, $CH_2=C(CH_3)CO_2(CH_2)_3Si(CH_3)_2(OC_2H_5)$, $CH_2=C(CH_3)CO_2(CH_2)_3Si(CH_3)_2OH$, $CH_2=CH(CH_2)_3Si(OCOCH_3)_3$, $CH_2=C(CH_3)CO_2(CH_2)_3SiC_2H_5(OCOCH_3)_2$, $CH_2=C(CH_3)CO_2(CH_2)_3SiCH_3(N(CH_3)COCH_3)_2$, $CH_2=CHCO_2(CH_2)_3SiCH_3[ON(CH_3)C_2H_5]_2$, and $CH_2=C(CH_3)CO_2(CH_2)_3SiC_6H_5[ON(CH_3)C_2H_5]_2$; vinylsilanes such as $CH_2=CHSi[ON=C(CH_3)(C_2H_5)]_3$, $CH_2=CHSi(OCH_3)_3$, $CH_2=CHSi(OC_2H_5)_3$, $CH_2=CHSiCH_3(OCH_3)_2$, $CH_2=CHSi(OCOCH_3)_3$, $CH_2=CHSi(CH_3)_2(OC_2H_5)$, $CH_2=CHSi(CH_3)_2SiCH_3(OCH_3)_2$, $CH_2=CHSiC_2H_5(OCOCH_3)_2$, $CH_2=CHSiCH_3$ [ON(CH_3)C_2H_5]_2$, vinyltrichlorosilane, and partially hydrolyzed products thereof; and vinyl ethers such as trimethoxysilylethyl vinyl ether, triethoxysilylethyl vinyl ether, trimethoxysilylbutyl vinyl ether, methyldimethoxysilylethyl vinyl ether, trimethoxysilylpropyl vinyl ether, and triethoxysilylpropyl vinyl ether.

The fluoropolymer preferably contains a polymerized unit derived from at least one fluorine-free vinyl monomer selected from the group consisting of vinyl carboxylates, alkyl vinyl ethers, and non-fluorinated olefins.

The vinyl carboxylates have an effect of improving the compatibility. Examples of the vinyl carboxylates include vinyl acetate, vinyl propionate, vinyl butyrate, vinyl isobutyrate, vinyl pivalte, vinyl caproate, vinyl versatate, vinyl laurate, vinyl stearate, vinyl cyclohexylcarboxylate, vinyl benzoate, and vinyl para-t-butylbenzoate.

Examples of the alkyl vinyl ethers include methyl vinyl ether, ethyl vinyl ether, butyl vinyl ether, and cyclohexyl vinyl ether.

Examples of the non-fluorinated olefins include ethylene, propylene, n-butene, and isobutene.

Examples of the fluoropolymer include: (1) perfluoroolefin polymers mainly composed of a perfluoroolefin unit; (2) chlorotrifluoroethylene (CTFE) polymers mainly composed of a CTFE unit; (3) vinylidene fluoride (VdF) polymers mainly composed of a VdF unit; (4) fluoroalkyl-containing polymers mainly composed of a fluoroalkyl unit; and (5) vinyl acetate polymers mainly composed of a vinyl acetate unit.

From the viewpoints of weather resistance and damp proofing, the fluoropolymer is preferably any of the polymers (1), (2), and (5) among the above fluoropolymers (1) to (5).

(1) Perfluoroolefin Polymers Mainly Composed of a Perfluoroolefin Unit

The perfluoroolefin polymers mainly composed of a perfluoroolefin unit each preferably contain a perfluoroolefin unit. The perfluoroolefin unit preferably represents 20 to 49 mol % of all the polymerized units of the perfluoroolefin polymer. The lower limit of this value is more preferably 30 mol %, still more preferably 40 mol %. The upper limit thereof is more preferably 47 mol %.

Examples of the perfluoroolefin include tetrafluoroethylene (TFE), hexafluoropropylene (HFP), and perfluoro(alkyl vinyl ethers) (PAVEs). From the viewpoints of excellent pigment dispersibility, weather resistance, copolymerizability, and chemical resistance, preferred among these is TFE.

The perfluoroolefin polymer preferably contains a unit of a different monomer copolymerizable with the perfluoroolefin.

Examples of the copolymerizable monomer include, but are not limited to, vinyl carboxylates such as vinyl acetate, vinyl propionate, vinyl butyrate, vinyl isobutyrate, vinyl pivalate, vinyl caproate, vinyl versatate, vinyl laurate, vinyl stearate, vinyl cyclohexylcarboxylate, vinyl benzoate, and vinyl para-t-butylbenzoate; alkyl vinyl ethers such as methyl vinyl ether, ethyl vinyl ether, butyl vinyl ether, and cyclohexyl vinyl ether; non-fluoroolefins such as ethylene, propylene, n-butene, and isobutene; and fluoromonomers such as vinylidene fluoride (VdF), chlorotrifluoroethylene (CTFE), vinyl fluoride (VF), and fluorovinyl ether.

Examples of the perfluoroolefin polymer mainly composed of a perfluoroolefin unit include copolymers of TFE/isobutylene/hydroxybutyl vinyl ether/different monomer, copolymers of TFE/vinyl versatate/hydroxybutyl vinyl ether/different monomer, and copolymers of TFE/VdF/hydroxybutyl vinyl ether/different monomer. Particularly preferred is at least one copolymer selected from the group consisting of copolymers of TFE/isobutylene/hydroxybutyl vinyl ether/different monomer and copolymers of TFE/vinyl versatate/hydroxybutyl vinyl ether/different monomer. Examples of coatings of such curable polymers include Zeffle® GK series (Daikin Industries, Ltd.).

(2) CTFE Polymers Mainly Composed of a Chlorotrifluoroethylene (CTFE) Unit

Examples of the CTFE polymers mainly composed of a CTFE unit include copolymers of CTFE/hydroxybutyl vinyl ether/different monomer. Examples of curable polymer coatings of the CTFE polymers include Lumiflon® (Asahi Glass Co., Ltd.), Fluonate® (DIC Corp.), and Cefral Coat® (Central Glass Co., Ltd.).

(3) VdF Polymers Mainly Composed of a Vinylidene Fluoride (VdF) Unit

Examples of the VdF polymers mainly composed of a VdF unit include copolymers of VdF/TFE/hydroxybutyl vinyl ether/different monomer.

(4) Fluoroalkyl-Containing Polymers Mainly Composed of a Fluoroalkyl Unit

Examples of the fluoroalkyl-containing polymers mainly composed of a fluoroalkyl unit include copolymers of $CF_3CF_2(CF_2CF_2)_nCH_2CH_2OCOCH=CH_2$ (mixture of n=3 and n=4)/2-hydroxyethyl methacrylate/stearyl acrylate. Examples of the fluoroalkyl-containing polymers include Unidyne® and Ftone® (Daikin Industries, Ltd.), and Zonyl® (DuPont).

(5) Vinyl Acetate Polymers Mainly Composed of a Vinyl acetate Unit

Examples of the vinyl acetate polymers mainly composed of a vinyl acetate unit include copolymers of fluorine-containing monomer/vinyl acetate/hydroxy-containing monomer represented by the formula (2)/carboxy-containing monomer represented by the formula (3). The copolymers each preferably satisfy that the mole ratio of fluorine-containing monomer/vinyl acetate/hydroxy-containing monomer represented by the formula (2)/carboxy-containing monomer represented by the formula (3) is (15 to 50)/(20 to 75)/(5 to 22)/(0.1 to 5).

The hydroxy-containing monomer represented by the formula (2) is preferably at least one monomer selected from the group consisting of hydroxyethyl vinyl ether (HEVE), hydroxybutyl vinyl ether (HBVE), 2-hydroxyethyl allyl ether, and 4-hydroxybutyl allyl ether.

In order to achieve improved polymerization reactivity and compatibility with additives such as a curing agent, n in the carboxy-containing monomer represented by the formula (3) is preferably as great as possible. Preferably, n is 2 or greater, more preferably 4 or greater, still more preferably 8 or greater. The upper limit thereof may be 20, for example. The carboxy-containing monomer represented by the formula (3) is preferably at least one selected from the group consisting of pentenoic acid, hexenoic acid, heptenoic acid, octenoic acid, nonenoic acid, decenoic acid, undecylenic acid, dodecenoic acid, tridecenoic acid, tetradecenoic acid, pentadecenoic acid, hexadecenoic acid, heptadecenoic acid, octadecenoic acid, nonadecenoic acid, eicosenoic acid, and 22-tricosenoic acid, more preferably undecylenic acid.

The copolymer may contain a different monomer unit. The different monomer unit preferably represents either 0 mol % or 25 mol % or less of all the structural units constituting the copolymer. Examples of the different monomer include non-aromatic vinyl esters other than vinyl acetate. Examples of the non-aromatic vinyl esters include vinyl versatate, vinyl laurate, vinyl stearate, and vinyl cyclohexylcarboxylate.

The vinyl acetate polymer preferably has a number average molecular weight of 3000 to 100000. The number average molecular weight is more preferably 5000 or more, still more preferably 8000 or more, while more preferably 50000 or less, still more preferably 35000 or less. The number average molecular weight can be determined by gel permeation chromatography (GPC) using tetrahydrofuran as an eluent.

The vinyl acetate polymer preferably has a glass transition temperature (second run) of 10° C. to 70° C., more preferably 14° C. to 60° C., determined with a differential scanning calorimeter (DSC).

The vinyl acetate polymer preferably has an acid value of 0.6 to 28.8 mgKOH/g, more preferably 2 to 12 mgKOH/g. The acid value is determined in conformity with JIS K5601.

The vinyl acetate polymer preferably has a hydroxyl value of 29 to 120 mgKOH/g, more preferably 100 mgKOH/g or less. The hydroxyl value can be calculated from the actual amount and solid content of the hydroxy monomers used in the polymerization.

The fluoropolymer can be produced by the method disclosed in JP 2004-204205 A or JP 2013-177536 A, for example. The composition of the fluoropolymer can be determined by techniques such as elemental analysis and NMR analysis.

In the composition, the polyaspartic acid ester and the fluoropolymer preferably have a mass ratio of 5/95 to 95/5, more preferably 20/80 to 80/20. Too small an amount of the polyaspartic acid ester tends to cause a failure in thickening each layer, while too small an amount of the fluoropolymer tends to cause a failure in imparting sufficient weather resistance and salt water resistance. In order to improve the weather resistance of the coating film, the mass ratio of the polyaspartic acid ester and the fluoropolymer is preferably lower than 50/50.

The composition preferably further contains a curing agent. Examples of the curing agent include polyisocyanate compounds, melamine resins, silicate compounds, and isocyanate group-containing silane compounds. Preferred are polyisocyanate compounds.

Examples of the polyisocyanate compounds include, but are not limited to, 2,4-tolylene diisocyanate, diphenylmethane-4,4'-diisocyanate, xylylene diisocyanate, isophorone diisocyanate, lysine methyl ester diisocyanate, methyl cyclohexyl diisocyanate, trimethyl hexamethylene diisocyanate, hexamethylene diisocyanate, n-pentane-1,4-diisocyanate, trimers thereof, adduct products, biuret products, or isocyanurate products thereof, polymers thereof containing two or more isocyanate groups, and block isocyanates. Preferred as the polyisocyanate compounds is hexamethylene diisocyanate. One example of the polyisocyanate compounds is Desmodur N3900 (available from Bayer).

The amount of the curing agent is preferably 10 to 75 mass %, more preferably 20 mass % or more, while more preferably 65 mass % or less, relative to the polyaspartic acid ester and the fluoropolymer.

The composition may further contain a solvent. The solvent is preferably an organic solvent, and examples thereof include esters such as ethyl acetate, butyl acetate, isopropyl acetate, isobutyl acetate, cellosolve acetate, methoxypropyl acetate, and propylene glycol methyl ether acetate; ketones such as acetone, methyl ethyl ketone, methyl isobutyl ketone, and cyclohexanone; cyclic ethers such as tetrahydrofuran and dioxane; amides such as N,N-dimethyl formamide and N,N-dimethyl acetamide; aromatic hydrocarbons such as xylene, toluene, and solvent naphtha; glycol ethers such as propylene glycol methyl ether and ethyl cellosolve; diethylene glycol esters such as carbitol acetate; aliphatic hydrocarbons such as n-pentane, n-hexane, n-heptane, n-octane, n-nonane, n-decane, n-undecane, n-dodecane, and mineral spirits; and solvent mixtures thereof.

The composition, when containing a solvent, preferably contains 5 to 95 mass %, more preferably 10 to 70 mass %, of the polyaspartic acid ester and the fluoropolymer in total.

The composition may further contain various additives in accordance with the characteristics required. Examples of the additives include a curing accelerator, a curing retarder, a pigment, a pigment dispersant, an antifoam, a leveling agent, an ultraviolet absorber, a photostabilizer, a thickening agent, an adhesion promoter, and a flatting agent. In particular, the composition preferably contains the pigment. Examples of the pigment include titanium oxide, talc, and barium sulfate.

Since the composition is capable of forming a coating film that is excellent in salt water resistance and weather resistance and that is less likely to deteriorate for a long time, it can suitably be used as a coating, especially as a coating to be applied to offshore structures or port facilities. A coating film obtainable by applying the composition to a base is also excellent in adhesion to the base. Thus, the coating film can restrain corrosion of the base due to permeation of salt.

Applying the composition to a base or to a layer disposed on the base provides a coating film. The composition can form a coating film having a thickness of 100 µm or greater by a single coating process. With a conventional solvent-type coating containing a hydroxy-containing fluoropolymer, for example, a coating film formed by a single coating process has a thickness of at most smaller than 100 µm.

A coating film obtainable from the composition is also one aspect of the invention. The coating film of the invention is excellent in salt water resistance and weather resistance and is less likely to deteriorate for a long time. The coating film of the invention is also excellent in adhesion to a base, and can restrain corrosion of the base due to permeation of salt.

The composition may be applied by, for example, spray coating, roll coating, dip (immersion) coating, impregnation coating, spin-flow coating, curtain-flow coating, or coating with a roller, a brush, or a doctor blade.

The composition applied to the base may be dried. When the polyaspartic acid ester is one represented by the formula (1), when the fluoropolymer contains a hydroxy group, and when the composition contains a curing agent, the polyaspartic acid ester, the fluoropolymer, and the curing agent undergo a curing reaction during the drying to provide a coating film that has much better salt water resistance and weather resistance and is much less likely to deteriorate for a long time. The curing reaction sufficiently proceeds even at room temperature.

In order to achieve excellent abrasion resistance, the coating film preferably has a hardness of H or higher. The hardness may be 4H or lower.

The hardness is determined with a pencil hardness tester in conformity with JIS K5600.

In order to achieve much better salt water resistance and weather resistance and to be much less likely to deteriorate for a long time, the coating film preferably has a thickness of 10 µm or greater, more preferably 30 µm or greater, still more preferably 100 µm or greater, while preferably 1000 µm or smaller, more preferably 800 µm or smaller.

In order to achieve much better salt water resistance and weather resistance and to be much less likely to deteriorate for a long time, the coating film preferably exhibits a corrosion from scribe of 1 mm or shorter.

A fluorine-containing coating film containing a urethane bond and a urea bond and exhibiting a corrosion from scribe of 1 mm or shorter is also one aspect of the invention.

Since the fluorine-containing coating film contains a urethane bond and a urea bond and exhibits a corrosion from scribe of 1 mm or shorter, it is excellent in salt water resistance and weather resistance and is less likely to deteriorate for a long time.

The fluorine-containing coating film refers to a coating film containing a fluorine atom. The presence of a fluorine atom in the coating film can be confirmed by techniques such as elemental analysis and NMR analysis.

The presence of the urethane bond and urea bond in the fluorine-containing coating film can be confirmed by an infrared absorption spectrum.

The corrosion from scribe refers to a degree of progress of rusting.

The corrosion from scribe can be determined as follows. First, a laminate including a base and the coating film or fluorine-containing coating film is prepared. Next, a scribe is made in the coating film or fluorine-containing coating film such that the scribe reaches the base, and salt water is sprayed on the laminate for 1440 hours. Then, the coating film or fluorine-containing coating film is peeled off the base, and the length of the rust extending from the scribe on the base surface (the maximum length thereof in the direction perpendicular to the scribe) is measured. The base used may be a base made of metal, and is preferably a base made of iron, more preferably a base made of steel.

In order to achieve excellent abrasion resistance, the fluorine-containing coating film preferably has a hardness of H or higher. The hardness may be 4H or lower.

The hardness is determined using a pencil hardness tester in conformity with JIS K5600.

In order to achieve much better salt water resistance and weather resistance and to be much less likely to deteriorate for a long time, the fluorine-containing coating film preferably has a thickness of 10 µm or greater, more preferably 30 µm or greater, still more preferably 100 µm or greater, while preferably 1000 µm or smaller, more preferably 800 µm or smaller.

The fluorine-containing coating film can be produced from the aforementioned composition.

The invention also relates to a laminate including a base and the aforementioned coating film or the aforementioned fluorine-containing coating film.

The coating film or fluorine-containing coating film may be disposed directly on the base, or may be disposed on the base with a different layer in between. The different layer is preferably a primer layer. The different layer is preferably a layer formed of epoxy resin, urethane resin, acrylic resin, silicone resin, or polyester resin, more preferably a layer formed of epoxy resin.

The base may be formed of a material such as metallic material, plastic, or concrete. The material is preferably the metallic material, more preferably iron, aluminum, stainless steel, or copper, still more preferably iron, particularly preferably steel.

EXAMPLES

The invention will be described hereinbelow referring to examples, but the invention is not limited to these examples.

The parameters in the examples were determined by the following methods.

Pencil Hardness

A pencil hardness test was performed in conformity with JIS K5600.

Cross-Hatch Test

A cross-hatch test (1 mm×1 mm×100 squares) was performed in conformity with JIS K5600, and the adhesion was evaluated by the number of remaining squares.

(Gloss)

An accelerated weathering test was performed for 500 hours and for 1000 hours using a UV fluorescent lamp accelerated weathering tester (Q-Lab Corp.).

Gloss

A gloss test was performed in conformity with JIS K5600.

(Blistering Area)

An accelerated weathering test was performed for 50 hours and 80 hours using an accelerated weathering tester with hydrogen peroxide.

For a coated sample plate before and after the accelerated weathering test, the number of blisters generated and the average area thereof were determined, and the blistering area relative to the whole area of the coated sample plate was calculated.

Thickness

The thickness was measured using an overcurrent thickness meter.

Salt Water Spray Test

This test was performed in conformity with ISO 12944 C5-M.

Corrosion From Scribe (mm)

A scribe was made in the coating film of the coated plate formed in each example, and salt water was sprayed thereon for 1440 hours. The coating film was peeled off, and the length of the rust extending from the scribe (the maximum length thereof in the direction perpendicular to the scribe) was measured.

Blistering in Coating Film

The quantity and size of the blisters in the coating film were measured in conformity with ISO 4628-2 (JIS K5600-8-2).

Rusting on Coating Film

The rusting was determined in conformity with ISO 4628-3 (JIS K5600-8-3).

Cracking in Coating Film

The cracking was determined in conformity with ISO 4628-4 (JIS K5600-8-4).

Flaking in Coating Film

The flaking was determined in conformity with ISO 4628-5 (JIS K5600-8-5).

The Presence or Absence of Urethane Bond

The presence or absence of a urethane bond was checked with an infrared absorption spectrum.

The Presence or Absence of Urea Bond

The presence or absence of a urea bond was checked with an infrared absorption spectrum.

Example 1

An epoxy primer base resin, an epoxy primer curing agent, and an epoxy thinner were mixed at a ratio shown in Table 1 to provide a coating composition. This coating composition was sprayed on an aluminum plate and a blast plate (SS400), and then cured and dried at room temperature for one day. Thereby, 30-μm cured coating films (1st Coats) were obtained. Separately, a polyaspartic acid ester (Desmophen NH1520, Bayer), Zeffle GK-570 (solid content: 65%, Daikin Industries, Ltd.), R960 (DuPont), and butyl acetate were mixed in amounts shown in Table 1, and Desmodur N3900 (Bayer) serving as a curing agent was mixed therewith to provide a coating composition. This coating composition was sprayed on the cured coating films (1st Coats) which were formed in advance. The coating compositions were dried at room temperature for two hours. Thereby, a coated plate (aluminum plate) and a coated plate (blast plate) each having a cured coating film (2nd Coat) were obtained. For the coated plate (aluminum plate), the pencil hardness, the cross-hatch test, the gloss, and the accelerated weathering resistance (blistering area) were assessed. For the coated plate (blast plate), the salt water resistance was assessed. In the infrared absorption spectrum, the peak derived from a urea bond was observed around 1720 $cm^{-1}$ and the peak derived from a urethane bond was observed around 1650 $cm^{-1}$. The other results are shown in Table 1.

Example 2

A coating composition was prepared in the same manner as in Example 1 except that the quantity ratio of the polyaspartic acid ester (Desmophen NH1520, Bayer) and Zeffle GK-570 (solid content: 65%, Daikin Industries, Ltd.) was changed. The coating composition was applied in the same manner as in Example 1 and dried at room temperature for two hours. Thereby, a coated plate (aluminum plate) and a coated plate (blast plate) each having a cured coating film (2nd Coat) were obtained. For the coated plate (aluminum plate), the pencil hardness, the cross-hatch test, the gloss, and the accelerated weathering resistance (blistering area) were assessed. For the coated plate (blast plate), the salt water resistance was assessed. In the infrared absorption spectrum, the peak derived from a urea bond was observed around 1720 $cm^{-1}$ and the peak derived from a urethane bond was observed around 1650 $cm^{-1}$. The other results are shown in Table 1.

Example 3

A polyaspartic acid ester (Desmophen NH1520, Bayer), Zeffle GK-570 (solid content: 65%, Daikin Industries, Ltd.), R960 (DuPont), and butyl acetate were mixed in amounts shown in Table 1, and Desmodur N3900 (Bayer) serving as a curing agent was mixed therewith to provide a coating composition. This coating composition was sprayed on an aluminum plate and a blast plate (SS400). The coating compositions were dried at room temperature for two hours. Thereby, a coated plate (aluminum plate) and a coated plate (blast plate) each having a 300-μm cured coating film were obtained. For the coated plate (aluminum plate), the infrared absorption spectrum, the pencil hardness, the cross-hatch test, the gloss, and the accelerated weathering resistance (blistering area) were assessed. For the coated plate (blast plate), the salt water resistance was assessed. In the infrared absorption spectrum, the peak derived from a urea bond was observed around 1720 $cm^{-1}$ and the peak derived from a urethane bond was observed around 1650 $cm^{-1}$. The other results are shown in Table 1.

Examples 4 and 5

A coating composition was prepared in the same manner as in Example 1 except that the formulation was changed as shown in Table 1. The coating composition was applied in the same manner as in Example 1 and dried at room temperature for two hours. Thereby, a coated plate (aluminum plate) and a coated plate (blast plate) each having a cured coating film (2nd Coat) were obtained. For the coated plate (aluminum plate), the pencil hardness, the cross-hatch test, the gloss, and the accelerated weathering resistance (blistering area) were assessed. For the coated plate (blast plate), the salt water resistance was assessed. In the infrared absorption spectrum, the peak derived from a urea bond was observed around 1720 cm$^{-1}$ and the peak derived from a urethane bond was observed around 1650 cm$^{-1}$. The other results are shown in Table 1.

Examples 6 and 7

A coating composition was prepared in the same manner as in Example 1 except that Lumiflon LF200 (solid content: 60%, Asahi Glass Co., Ltd.) was used and the formulation was changed as shown in Table 1. The coating composition was applied in the same manner as in Example 1 and dried at room temperature for two hours. Thereby, a coated plate (aluminum plate) and a coated plate (blast plate) each having a cured coating film (2nd Coat) were obtained. For the coated plate (aluminum plate), the pencil hardness, the cross-hatch test, the gloss, and the accelerated weathering resistance (blistering area) were assessed. For the coated plate (blast plate), the salt water resistance was assessed. In the infrared absorption spectrum, the peak derived from a urea bond was observed around 1720 cm$^{-1}$ and the peak derived from a urethane bond was observed around 1650 cm$^{-1}$. The other results are shown in Table 1.

Comparative Example 1

An epoxy primer base resin, an epoxy primer curing agent, and an epoxy thinner were mixed at a ratio shown in Table 1 to provide a coating composition. This coating composition was sprayed on an aluminum plate and a blast plate (SS400), and then cured and dried at room temperature for one day. Thereby, 30-μm cured coating films (1st Coats) were obtained. Separately, a polyaspartic acid ester (Desmophen NH1520, Bayer), R960 (DuPont), and butyl acetate were mixed and Desmodur N3900 (Bayer) serving as a curing agent was mixed therewith to provide a coating composition. This coating composition was sprayed on the cured coating films (1st Coats) which were formed in advance. The coating compositions were dried at room temperature for two hours. Thereby, a coated plate (aluminum plate) and a coated plate (blast plate) each having a cured coating film (2nd Coat) were obtained. For the coated plate (aluminum plate), the pencil hardness, the cross-hatch test, the gloss, and the accelerated weathering resistance (blistering area) were assessed. For the coated plate (blast plate), the salt water resistance was assessed. In the infrared absorption spectrum, the peak derived from a urea bond was observed around 1720 cm$^{-1}$, but no peak derived from a urethane bond was observed. The other results are shown in Table 1.

Comparative Example 2

A polyaspartic acid ester (Desmophen NH1520, Bayer), R960 (DuPont), and butyl acetate were mixed and Desmodur N3900 (Bayer) serving as a curing agent was mixed therewith to provide a coating composition. This coating composition was sprayed on an aluminum plate and a blast plate (SS400). The coating compositions were dried at room temperature for two hours. Thereby, a coated plate (aluminum plate) and a coated plate (blast plate) each having a cured coating film were obtained. For the coated plate (aluminum plate), the pencil hardness, the cross-hatch test, the gloss, and the accelerated weathering resistance (blistering area) were assessed. For the coated plate (blast plate), the salt water resistance was assessed. In the infrared absorption spectrum, the peak derived from a urea bond was observed around 1720 cm$^{-1}$, but no peak derived from a urethane bond was observed. The other results are shown in Table 1.

TABLE 1

| | Components | No. Unit | Example 1 1st Coat | Example 1 2nd Coat | Example 2 1st Coat | Example 2 2nd Coat | Example 3 | Example 4 1st Coat | Example 4 2nd Coat | Example 5 1st Coat |
|---|---|---|---|---|---|---|---|---|---|---|
| Formulation | Epoxy primer base resin | phr | 80.0 | | 80.0 | | | 80.0 | | 80.0 |
| | Epoxy primer curing agent | phr | 20.0 | | 20.0 | | | 20.0 | | 20.0 |
| | polyaspartic acid ester | phr | | 22.2 | | 14.8 | 14.8 | | 22.2 | |
| | Zeffle GK570 (65% solid) | phr | | 29.5 | | 47.3 | 47.3 | | 14.4 | |
| | Lumiflon LF200 (60% solid) | phr | | | | | | | | |
| | R960 | phr | | 34.6 | | 37.6 | 37.6 | | 26.2 | |
| | Butyl acetate | phr | | 35.3 | | 45.1 | 45.1 | | 26.7 | |
| | Desmodur N3900 | phr | | 18.7 | | 16.4 | 16.4 | | 16.7 | |
| | Epoxy thinner | phr | 60.0 | | 60.0 | | | 60.0 | | 60.0 |
| Thickness | | μm | 30 | 200 | 30 | 200 | 220 | 30 | 210 | 30 |
| Hardness | Pencil hardness | | | H | | HB | HB | | H | HB |
| Adhesion | Cross-hatch test | | | 100/100 | | 100/100 | 100/100 | | 100/100 | 100/100 |
| Accelerated weather resistance with UV fluorescent lamp | Gloss | Initial | | 90 | | 89 | 88 | | 91 | 87 |
| | | 500 hr | | 80 | | 83 | 81 | | 74 | 83 |
| | | 1000 hr | | 47 | | 79 | 78 | | 35 | 80 |

TABLE 1-continued

|  |  |  | | | | | |
|---|---|---|---|---|---|---|---|
| Accelerated weather resistance with hydrogen peroxide | Blistering area (%) | Initial | 0 | 0 | 0 | 0 | 0 |
|  |  | 50 hr | 0 | 0 | 0 | 0 | 0 |
|  |  | 80 hr | 0 | 0 | 0 | 0 | 0 |
| Salt water resistance (Salt water spray test) 1440 hr (ISO12944 C5-M standard) | Corrosion from scribe (mm) | 1 mm or shorter: passed | 0 mm | 0 mm | 0 mm | 0 mm | 0 mm |
|  | Blistering ISO 4628-2 (JIS K5600-8-2) | Quantity (size) 0: none, 5: dense (large) | 1 (5<) | 0 (0) | 0 (0) | 0 (0) | 0 (0) |
|  | Rusting ISO 4628-3 (JIS K5600-8-3) | * Excluding rust extending from scribe | 0 | 0 | 0 | 0 | 0 |
|  | Cracking ISO 4628-4 (JIS K5600-8-4) |  | 0 | 0 | 0 | 0 | 0 |
|  | Flaking ISO4628-5 (JIS K5600-8-5) |  | 0 | 0 | 0 | 0 | 0 |

| | | | Example 5 | Example 6 | | Example 7 | | Comparative Example 1 | | Comparative Example 2 |
|---|---|---|---|---|---|---|---|---|---|---|
| | Components | No. Unit | 2nd Coat | 1st Coat | 2nd Coat | 1st Coat | 2nd Coat | 1st Coat | 2nd Coat | |
| Formulation | Epoxy primer base resin | phr |  | 80.0 |  | 80.0 |  | 80.0 |  |  |
|  | Epoxy primer curing agent | phr |  | 20.0 |  | 20.0 |  | 20.0 |  |  |
|  | polyaspartic acid ester | phr | 17.9 |  | 22.2 |  | 14.8 |  | 37.9 | 37.9 |
|  | Zeffle GK570 (65% solid) | phr | 64.6 |  |  |  |  |  |  |  |
|  | Lumiflon LF200 (60% solid) | phr |  |  | 15.6 |  | 57.5 |  |  |  |
|  | R960 | phr | 49.7 |  | 26.2 |  | 37.6 |  | 31.8 | 31.8 |
|  | Butyl acetate | phr | 50.6 |  | 26.7 |  | 45.1 |  | 21.4 | 21.4 |
|  | Desmodur N3900 | phr | 20.8 |  | 16.7 |  | 16.4 |  | 25 | 25 |
|  | Epoxy thinner | phr |  | 60.0 |  | 60.0 |  | 60.0 |  |  |
| Thickness |  | μm | 220 | 30 | 220 | 30 | 220 | 30 | 205 | 230 |
| Hardness | Pencil hardness |  | H | B |  | B |  | H |  | H |
| Adhesion | Cross-hatch test |  | 100/100 | 100/100 |  | 100/100 |  | 100/100 |  | 20/100 |
| Accelerated weather resistance with UV fluorescent lamp | Gloss | Initial | 87 | 89 |  | 90 |  | 92 |  | 90 |
|  |  | 500 hr | 83 | 77 |  | 82 |  | 45 |  | 41 |
|  |  | 1000 hr | 80 | 33 |  | 77 |  | 22 |  | 20 |
| Accelerated weather resistance with hydrogen peroxide | Blistering area (%) | Initial | 0 | 0 |  | 0 |  | 0 |  | 0 |
|  |  | 50 hr | 0 | 0 |  | 0 |  | 10 |  | 15 |
|  |  | 80 hr | 0 | 0 |  | 0 |  | 80 |  | 85 |
| Salt water resistance (Salt water spray test) 1440 hr (ISO12944 C5-M standard) | Corrosion from scribe (mm) | 1 mm or shorter: passed | 0 mm | 0 mm |  | 0 mm |  | 2 mm |  | 2 mm |
|  | Blistering ISO 4628-2 (JIS K5600-8-2) | Quantity (size) 0: none, 5: dense (large) | 0 (0) | 0 (0) |  | 0 (0) |  | 1 (4) |  | 1 (4) |
|  | Rusting ISO 4628-3 (JIS K5600-8-3) | * Excluding rust extending from scribe | 0 | 0 |  | 0 |  | 0 |  | 0 |
|  | Cracking ISO 4628-4 (JIS K5600-8-4) |  | 0 | 0 |  | 0 |  | 0 |  | 0 |
|  | Flaking ISO4628-5 (JIS K5600-8-5) |  | 0 | 0 |  | 0 |  | 0 |  | 0 |

Table 1 demonstrates that the coating films containing both a urethane bond and a urea bond exerted the effects.

What is claimed is:

1. A coating film obtained from a composition comprising:
    a polyaspartic acid ester; and
    a fluoropolymer,
    wherein the coating film has a dry thickness of 100 to 1000 μm,
    wherein the polyaspartic acid ester and the fluoropolymer have a mass ratio of 59/41 or higher.

2. The coating film according to claim 1,
    wherein the polyaspartic acid ester is represented by the following formula (1):

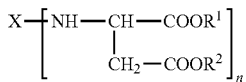

wherein X is an n-valent group obtainable from an organic polyamine that contains n primary amino groups bonding to an acyclic or cyclic aliphatic structure by removing the primary amino groups therefrom; the organic polyamine having a number average molecular weight of 88 to 400 prior to the removal of the primary amino groups; $R^1$ and $R^2$ are the same as or different from each other, and are each a C1-C18 organic group; and n is an integer of 2 or greater.

3. The coating film according to claim 1,
    wherein the fluoropolymer is a curable functional group-containing fluoropolymer.

4. The coating film according to claim 1,
    wherein the fluoropolymer is a hydroxy-containing fluoropolymer.

5. The coating film according to claim 1, wherein the composition further comprises a curing agent.

6. The coating film according to claim 5,
    wherein the curing agent is a polyisocyanate compound.

7. The coating film according to claim 1, wherein the composition further comprises a solvent.

8. The coating film according to claim 1, the composition of which serves as a coating to be applied to an offshore structure or a port facility.

9. A laminate comprising:
    a base; and
    the coating film according to claim 1.

10. The laminate according to claim 9, further comprising a layer formed of epoxy resin.

11. The laminate according to claim 9,
    wherein the base is formed of iron.

12. The coating film according to claim 1,
    wherein the coating film exhibits a corrosion from scribe of 1 mm or shorter.

13. The coating film according to claim 1,
    wherein the coating film has a hardness of H or higher.

14. The coating film according to claim 1,
    wherein the polyaspartic acid ester and the fluoropolymer have a mass ratio of 59/41 to 61/39.

* * * * *